(12) United States Patent
Uchida et al.

(10) Patent No.: US 7,710,468 B2
(45) Date of Patent: May 4, 2010

(54) IMAGING APPARATUS WITH MEMORY FOR STORING CAMERA THROUGH IMAGE DATA

(75) Inventors: Akihiro Uchida, Saitama (JP); Keiichiro Takahashi, Saitama (JP)

(73) Assignee: Fujifilm Corporation, Tokyo (JP)

( * ) Notice: Subject to any disclaimer, the term of this patent is extended or adjusted under 35 U.S.C. 154(b) by 416 days.

(21) Appl. No.: 11/714,814

(22) Filed: Mar. 7, 2007

(65) Prior Publication Data
US 2007/0211153 A1    Sep. 13, 2007

(30) Foreign Application Priority Data
Mar. 8, 2006    (JP)    .............. 2006-063217

(51) Int. Cl.
*H04N 5/76*    (2006.01)
(52) U.S. Cl. ............... 348/231.99; 348/222.1; 348/240.2; 348/333.01
(58) Field of Classification Search ............. 348/222.1, 348/321.99, 231.9, 240.1, 240.2, 294, 333.01
See application file for complete search history.

(56) References Cited

U.S. PATENT DOCUMENTS 5,815,199 A * 9/1998 Palm et al. ................. 348/143
2002/0196348 A1* 12/2002 Kubo ....................... 348/220.1
2004/0252206 A1* 12/2004 Tsumura et al. ......... 348/231.99
2006/0114334 A1* 6/2006 Watanabe et al. ......... 348/222.1
2007/0097450 A1* 5/2007 Yamamoto ............. 358/426.01
2007/0146810 A1* 6/2007 Kubo et al. ................. 358/448

FOREIGN PATENT DOCUMENTS

JP        6-124073 A     5/1994
JP       11-296155 A    10/1999

* cited by examiner

*Primary Examiner*—Gevell Selby
(74) *Attorney, Agent, or Firm*—Birch, Stewart, Kolasch & Birch, LLP

(57) ABSTRACT

An LCD driver starts reading a digital image signal of one frame from a VRAM in response to a reproduction timing signal. A driving timing signal generator generates a driving timing signal in response to a synchronizing signal, whose phase is shifted by a delay time from the reproduction timing signal. So a phase difference corresponding to the delay time is provided between the driving timing signal and the reproduction timing signal. Synchronously with the driving timing signal, an image sensor is driven to shoot a subject and output an analog image signal of one frame. After being converted into a digital form, the image signal is written in the VRAM sequentially from the first line of one frame. The phase difference is determined so that the LCD driver starts reading the image signal sequentially from the first line, immediately after the first line is written in the VRAM.

6 Claims, 7 Drawing Sheets

IMAGING APPARATUS WITH MEMORY FOR STORING CAMERA THROUGH IMAGE DATA

FIELD OF THE INVENTION

The present invention relates to an imaging apparatus that displays a moving image of a subject that an image sensor is presently imaging, the image being called a camera-through image or live image.

BACKGROUND OF THE INVENTION

As a kind of imaging apparatus, digital cameras have been widely used. The digital camera images a subject through an image sensor such as a CCD image sensor. Many of the digital cameras are provided with a display device such as a LCD panel. The display device is not only used for displaying images reproduced based on captured image data, but also used as an electronic viewfinder for displaying the camera-through image. To display the camera-through image, the image sensor periodically outputs image signals at a predetermined frame rate, and the image frames obtained through the image sensor are sequentially displayed on the display device. Thus, the display device displays a moving image of a subject that exists in a shooting field of the image sensor in a real time fashion. So the camera user can frame and shoot a scene while observing the camera-through image.

Generally, the display device is driven asynchronously with the image sensor. To display the camera-through image, the image data obtained through the imaging by the image sensor is temporarily written in an image memory and, thereafter, the image data is read out of the image memory and is sent to the display device in synchronism with driving timing of the display device.

As a method of driving the display device and the image sensor asynchronously, Japanese Laid-open Patent Application No. Hei 6-124073 teaches using a couple of image memories having a capacity of storing image data of one frame each. According to this prior art, image data as transferred from an external device is written in one of the two image memories, while the image data written in the other image memory is being read out to display image frames at a frame rate of 60 frames per second on the display device. Each time the image data of one frame is completely read out of one memory, the two image memories alternate their rolls for writing and reading the image data.

Japanese Laid-open Patent Application No. Hei 11-296155 discloses a technique using first to third frame buffer memories as image memories. According to this prior art, one of the three buffer memories is used for writing the supplied image data, while other two buffer memories are used for reading the image data. When the writing of the image data of one frame completes in the first buffer memory, image data of another frame starts being written in the second buffer memory. In a period from the completion of writing the image data in the first buffer memory to the start of reading the image data from the first buffer memory, image data having been written in the third butter memory is used for displaying an image frame on a display device. Thus, even where the rate of writing the supplied image data differs from the rate of reading the image data, the respective frame buffer memories avoid being double-accessed for writing and reading the image data at the same time.

However, according to the above-mentioned methods of writing and reading image data for displaying an image, there is a time lag of more than one frame period from a time when an image frame of a subject is obtained by an image sensor to a time when the obtained image frame is displayed on a display device. Therefore, these prior arts have a problem when they are applied to a digital camera for displaying the camera-through image, that the camera user cannot exactly capture a picture at an expected moment because of the time lag between the actual movement of the subject and the camera-through image. Such a delay in shutter timing cannot be negligible when the subject moves quickly.

SUMMARY OF THE INVENTION

In view of the foregoing, a primary object of the present invention is to provide an imaging apparatus that reduces the time lag from shooting an image frame by an image sensor to displaying the image frame as the camera-through image on a display device.

An imaging apparatus of the present invention comprises an image sensor that is driven to shoot a subject to output an image signal of one frame; an image memory for storing the image signal of one frame, wherein the image signal is written in the image memory synchronously with the output of the image signal from the image sensor, and is read out of the image memory for displaying an image reproduced from the image signal; and a synchronizing device for synchronizing driving timing of the image sensor with reproduction timing to start reading the image signal of one frame out of the image memory, while providing such a phase difference between the driving timing and the reproduction timing that the reading of the image signal of one frame starts before the image signal of the one frame is completely written in the image memory.

More specifically, an imaging apparatus of the present invention comprises a driving timing signal generator for generating a driving timing signal; an image sensor that is driven to shoot a subject to output an image signal of one frame synchronously with the driving timing signal; an image memory for storing the image signal of one frame; a writing device for writing the image signal of one frame in the image memory synchronously with the output of the image signal from the image sensor; a reproduction timing signal generator for generating a reproduction timing signal; a reading device that starts reading the image signal of one frame out of the image memory synchronously with the reproduction timing signal, to display an image of the subject shot by the image sensor; and a synchronizing device for synchronizing the driving timing signal with the reproduction timing signal, while providing such a phase difference between the driving timing signal and the reproduction timing signal that the reading device starts reading the image signal of one frame before the writing device completes writing the image signal of the one frame.

According to a preferred embodiment, the imaging device further comprises a first resolution converting device that crops a designated image cropping area out of the image signal of one frame before being written in the image memory, and converts an absolute resolution of the image cropping area so as to coincide with an absolute resolution of a display screen for displaying the image of the subject, wherein the writing device writes the image signal obtained from the first resolution converting device in the image memory, and the synchronizing device decides the phase difference between the driving timing signal and the reproduction timing signal, taking account of a time necessary for the process in the first resolution converting device.

According to another preferred embodiment, the imaging device further comprises a second resolution converting device that converts the image signal of one frame to a smaller absolute resolution to display an image of the subject in a reduced size on a display screen, wherein the writing device writes an image signal obtained from the second resolution converting device in a memory location of the image memory, corresponding to a display zone for displaying the reduced image on the display screen, whereas the reading device reads the image signal of one frame sequentially out of the image memory, including the image signal written in the memory location, and wherein the synchronizing device decides the phase difference between the driving timing signal and the reproduction timing signal, so that the reading device starts reading a last line of the image signal written in the memory location after the last line is written in the memory location.

The synchronizing device preferably controls the driving timing signal generator so as to synchronize the driving timing signal on the basis of the reproduction timing signal, wherein the driving timing signal generator generates the driving timing signal in a longer period than a generation period of the reproduction timing signal, and is reset to generate the driving timing signal immediately after the reset in response to a reset signal given from the synchronizing device. The synchronizing device produces the reset signal by shifting the reproduction timing signal by a predetermined delay time.

According to the present invention, the synchronizing device synchronizes the driving timing signal that defines the driving timing of the image sensor with the reproduction timing signal that defines the timing of reading of the image signal from the image memory, while providing such a phase difference between these timing signals that the reading of the image signal of one frame starts before the completion of writing the image signal of the one frame in the image memory. Therefore, the time lag from a time when the image sensor outputs the image signal to a time when a camera-through image is displayed based on that image signal is reduced.

BRIEF DESCRIPTION OF THE DRAWINGS

The above and other objects and advantages of the present invention will be more apparent from the following detailed description of the preferred embodiments when read in connection with the accompanied drawings, wherein like reference numerals designate like or corresponding parts throughout the several views, and wherein.

DESCRIPTION OF THE PREFERRED EMBODIMENTS

Figure 1:
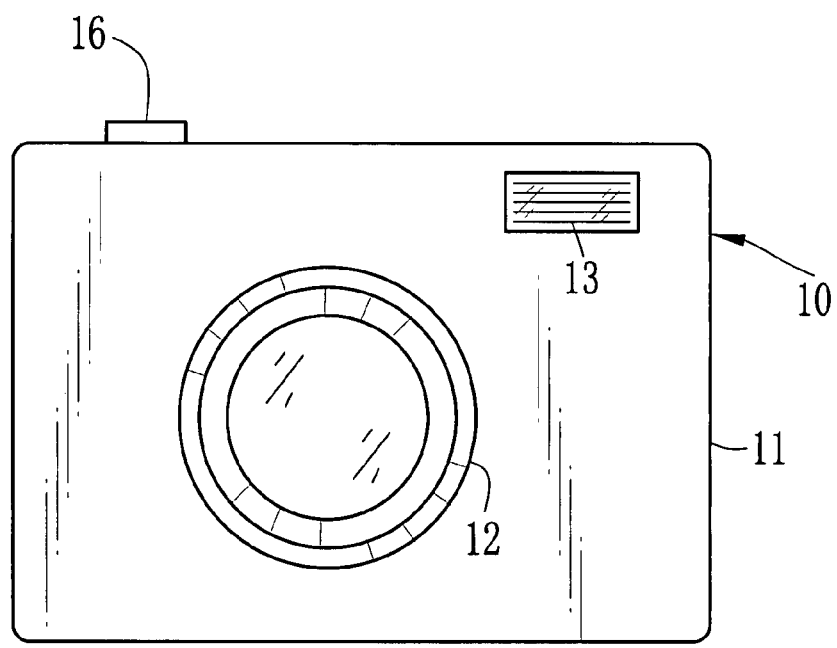
FIG. 1 is a front view of a digital camera according to an embodiment of the present invention.
Figure 2:
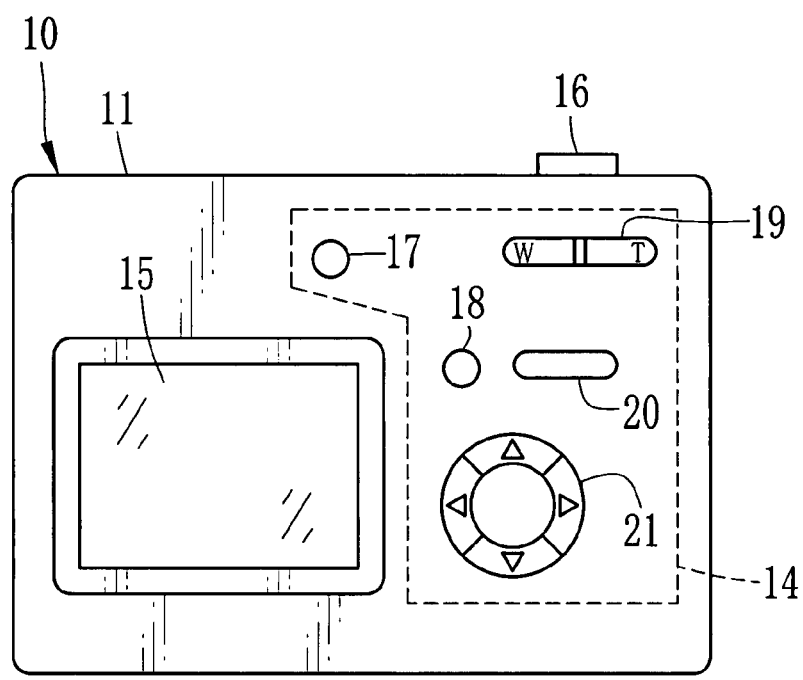
FIG. 2 is a rear view of the digital camera shown in FIG. 1.

FIGS. 1 and 2 show front and back side views of a digital camera 10 embodying an imaging apparatus of the present invention, respectively. The digital camera 10 is provided with a taking lens 12 and a flash projector 13 on the front of a camera body 11, and with an operating section 14 consisting of various operating members and a LCD 15 as a display apparatus on the back. A release button 16 is provided on a top side of the camera body 11.

The operating section 14 consists of a power button 17, a mode button 18, a zoom button 19, a menu button 20 and a cross key 21. The power button 17 is to power on or off the digital camera 10 by a press operation. Upon each pressing operation, the mode button 18 switches over between a shooting mode for shooting and recording still images according to the press operation of the release button 16, and a reproducing mode for reproducing and displaying captured images on the LCD 15.

Operating the zoom button 19 in the shooting mode enables the taking lens 12 to zoom to a wide-angle end or a telephoto end. When the zoom button 19 is operated further to a telephoto side after zooming the taking lens 12 to the telephoto end, the digital camera 10 proceeds from a normal shooting mode to an electronic zooming mode, wherein a part of the captured image is cropped and enlarged by an image processing.

The press operation on the menu button 20 causes the LCD 15 to display a menu that enables various settings of the digital camera 10, including for example a flash mode switching in the shooting mode. It is also possible to select an after-mentioned assist thumbnail mode from the menu screen. The cross key 21 is constituted of four keys located on the left, right, top and bottom and used for various setting operations, such as selection of an item on the menu, frame advancing or selection of the reproduced images.

The release button 16 can be operated by halfway pressing for pressing lightly and by full pressing for pressing more than the half-press. When not executing the press operation of the release button 16 in the shooting mode, an image sensor 24 (see FIG. 3) arranged behind the taking lens 12 picks up image data for use in displaying camera-through images, and the camera-through image is displayed on the LCD 15.

The camera-through image is a moving live image of a subject, so the LCD 15 functions as an electronic viewfinder by displaying the camera-through image. According to this embodiment, the LCD 15 is the display device for displaying the camera-through image. But the display device may be an external monitor or the like that is connected to the digital camera 10.

When the release button 16 is half-pressed, preparing processes are executed including an auto exposure (AE) process for deciding a shutter speed, an aperture size and an imaging sensitivity for shooting the still image, and an auto focusing (AF) process for bringing the taking lens 12 into focus on the subject. While the release button 16 is kept half-pressed even after completing the preparing processes, the camera-through images are displayed on the LCD 15, like while the release button 16 is not pressed.

When the release button 16 is full-pressed, the shooting of the still image is executed with the shutter speed, the aperture size and the imaging sensitivity, which are decided upon the previous halfway pressing. The captured still image is converted into image data to be recorded in a removable memory card 25 (see FIG. 3). The flash projector 13 exposes the subject to a flash in shooting the still images, when subject brightness of a main subject is under a given level.

Figure 3:
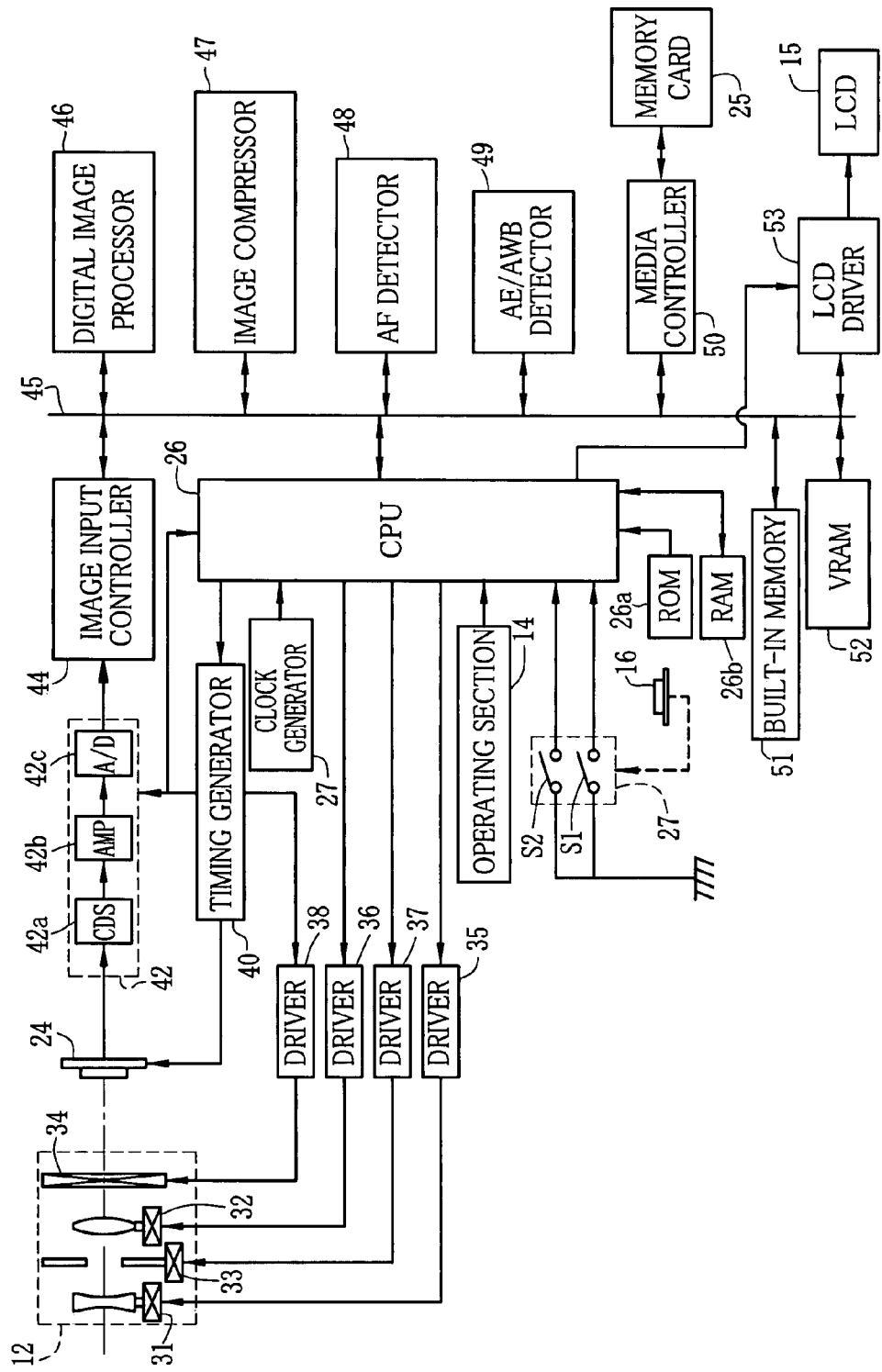
FIG. 3 is a block diagram illustrating the circuitry of the digital camera of FIG. 1.

FIG. 3 illustrates the construction of the digital camera 10. The operating section 14 sends an operating signal to a CPU 26, according to the operation of respective components of the operating section 14. A switch section 27 consists of switches S1 and S2 that turn on or off linked to the press of the release button 16. The switch S1 turns on when the release button 16 is half-pressed and the switch S2 turns on when the release button 16 is full-pressed. On and off of respective switches S1 and S2 are sent to the CPU 26.

The CPU 26 controls every part based on various signals from the operating section 14 and the switch section 27. The CPU 26 is connected to a ROM 26*a* and a RAM 26*b*. In the ROM 26*a*, programs for executing various sequences are written and the CPU 26 controls every part based on the programs. The RAM 26*b* is used as a work memory for temporarily storing necessary data in executing a shooting sequence and the like.

A clock generator circuit 27 generates a clock signal of a given frequency and supplies the clock signal to the CPU 26. The CPU 26 uses the clock signal to generate an after-mentioned reproduction timing signal and also generates a synchronizing signal based on the reproduction timing signal.

In the taking lens 12, a zoom mechanism 31, a focus mechanism 32, an aperture device 33 and a shutter device 34 are built in. The zoom mechanism 31 executes zooming by moving component lenses of the taking lens 12 according to a zooming operation of the operating section 14, and the focus mechanism 32 executes focusing. The aperture device 33 adjusts light intensity of subject light which enters through the taking lens 12 to the image sensor 24, by adjusting an aperture size of the stop. The drive of the zoom mechanism 31, the focus mechanism 32 and the aperture device 33 is controlled by the CPU 26 via respective corresponding drivers 35, 36 and 37. The taking lens 12 can be a fixed focal length lens.

The shutter device 34 is usually in an open state where a shutter blade is open. Upon the release button 16 being fully pressed down, the image sensor 24 stores electric charges for a given time to shoot a frame. Immediately after the completion of shooting of one frame, the shutter blade is closed to prevent the subject light from entering to the image sensor 24 and thus prevent smear from occurring. The shutter device 34 is connected to a timing generator 40 via a driver 38 and activated by a shutter drive signal from the timing generator 40.

The image sensor 24 is placed at the rear of the taking lens 12, and a subject image by the taking lens 12 is produced on a light receiving surface of the image sensor 24. On the light receiving surface of the image sensor 24, a number of photoelectric conversion cells are arranged in a matrix. Each individual photoelectric conversion cell consists of a photodiode that converts incoming light into electric charge of an amount corresponding to the amount of light, and a color filter of red (R), green (G) or blue (B).

The image sensor 24 shoots the subject by converting the incoming light into the electric charge and storing the charge of the corresponding amount to the light amount in the above-mentioned individual photoelectric conversion cells. The image sensor 24 is driven by various drive signals from the timing generator 40 and outputs the captured subject image as an analog image signal. As the image sensor 24, for example a CCD image sensor is used. However the image sensor 24 is not limited to the CCD image sensor, but it is possible to use for example an image sensor of a MOS type.

The above-mentioned image sensor 24 is provided with for example millions of photoelectric conversion cells. When shooting the still images by pressing the release button 16, an image signal of high resolution (absolute resolution) with a very large number of pixels, is outputted, making full use of the cells. When displaying the camera-through image, an image signal of a reduced number of pixels, L lines×M pixels (L, M=positive integers), is outputted. That is, the number of pixels is reduced to a degree necessary for displaying the image on the LCD 15 by controlling charge transfer so as to execute pixel mixing, pixel skipping and so on.

The timing generator 40 generates a driving timing signal when it receives the synchronizing signal from the CPU 26, as described later, and then generates the various drive signals in synchronism with the driving timing signal, to drive the image sensor 24. Therefore, in synchronized timing with the driving timing signal, the image sensor 24 shoots the subject and outputs the image signal gained from the shooting.

When displaying the camera-through image, the driving timing signal is repeatedly generated to drive the image sensor 24 at every driving timing signal, to start storing the charge as an image signal and simultaneously output another image signal as charged upon the preceding driving timing signal. The driving timing signal is also sent to the CPU 26 and an analog signal processor 42, for use in controlling timing of after-mentioned analog signal processing, digital image processing and the like.

The image signal from the image sensor 24 is sent to the analog signal processor 42. The analog signal processor 42 consists of a correlated double sampling (CDS) circuit 42*a*, an amplifier (AMP) circuit 42*b* and an A/D converter 42*c*. The analog signal processor 42 executes many kinds of analog signal processing to the image signal in the synchronizing timing with the driving timing signal. The CDS circuit 42*a* removes noise from the image signal by executing correlated double sampling. The AMP circuit 42*b* amplifies the image signal by a gain according to the imaging sensitivity and executes white balance correction. The A/D converter 42*c* converts the analog image signal from the AMP circuit 42*b* into a digital signal.

The digital image signal which is converted in the analog signal processor 42, hereinafter referred to as image data, is sent to an image input controller 44. The image input controller 44 controls input of the image data to a bus 45. Because the bus 45 is connected to the CPU 26, a digital image processor 46, an image compressor 47, an AF detector 48, an AE/AWB detector 49, a media controller 50, a built-in memory 51, a VRAM 52 and an LCD driver 53, respective parts are controlled by the CPU 26 via the bus 45 and enable to give and receive the data with each other.

The digital image processor 46 executes the digital image processes to the image data, such as γ correction and Y/C conversion which converts the image data of RGB into data on the brightness (Y) and respective color differences (Cr, Cb). When displaying the camera-through images in the electronic zooming mode, the digital image processor 46 executes a cropping process for cropping an image cropping area, whose size depends on magnification of the electronic zooming, from an effective image area of L lines×M pixels, and a first resolution converting process for converting the number of pixels of a frame, in order to display the image cropped from the image cropping area as a frame of image on the LCD 15.

Moreover, when displaying the camera-through image in the assist thumbnail mode, the digital image processor 46 executes a second resolution converting process for converting the absolute resolution of the effective image area into a smaller absolute resolution, and other processes such as one for displaying thumbnail images based on the image data read out of the memory card 25.

The image compressor 47 compresses the image data to send to the media controller 50 when recording the image data in the memory card 25. The image compressor 47 also expands the compressed image data read out of the memory card 25 in a reproduction mode.

The AF detector 48 detects contrast of shooting image by using the image data outputted from the image input controller 44, and sends the contrast data to the CPU 26. Referring to the contrast data, the CPU 26 focuses the taking lens 12 on the on-camera subject by driving the focus mechanism 32 through the driver 36, so as to make the contrast the largest.

The AE/AWB detector 49 detects the subject brightness of the on-camera subject image and the kind of light source based on the image data from the image input controller 44, to send the subject brightness data and the light source data to the CPU 26. Based on the light source data, the CPU 26 sets a parameter for the white balance in the analog signal processor 42. The CPU 26 also decides an appropriate aperture size, shutter speed and others based on the subject brightness data to control.

The media controller 50 controls writing and reading of the image data in the memory card 25. The image data which should be recorded in the memory card 25 is stored once in the built-in memory 51, after being subjected to the digital image processing in the digital image processor 46. Then, the image data is read out of the built-in memory 51 by the image compressor 47, and the compressed image data is written in the memory card 25. In the reproduction mode, the image data stored in the memory card 25 is read out by the media controller 50 and is sent to the image compressor 47 for the data expansion.

The built-in memory 51 uses for example a SDRAM, which is capable of reading and writing data, and temporarily stores the image data to be processed in the digital image processor 46 and the image compressor 47, as described above.

The VRAM 52 is a video memory or image memory for temporarily storing the image data of the images that should be displayed on the LCD 15. The image data of L lines×M pixels to be displayed on the LCD 15 is written in the VRAM 52. When displaying the camera-through images, the image data after going through various processes is written in the VRAM 52 by the digital image processor 46 as a writing device. In the reproduction mode, the image data which is read out of the memory card 25 and expanded in the image compressor 47 is written. According to this embodiment, the VRAM 52 is provided specially as the image recording device. It is also possible to provide with a memory area for writing the image data of the images to be displayed in for example the built-in memory 51.

The LCD driver 53 is a reading device which starts to read the image data for one frame in the timing synchronized with the reproduction timing signal. When the reproduction timing signal is inputted, the LCD driver 53 reads the image data by every line from the VRAM 52 and drives the LCD 15 based on the read image data. This allows the subject image captured by the image sensor 24 and the image stored in the memory card 25 to be displayed on the LCD 15. The reproduction timing signal is generated in a constant reproduction period Tt by the CPU 26 and is inputted in the LCD driver 53. According to this embodiment, the reproduction period Tt is 1/60 second.

In order to display the camera-through image on an external monitor device and the like, the image data may be read by a reading device and converted by a D/A converter into an analog image signal of a given format, to output the analog image signal the external monitor.

Figure 4:
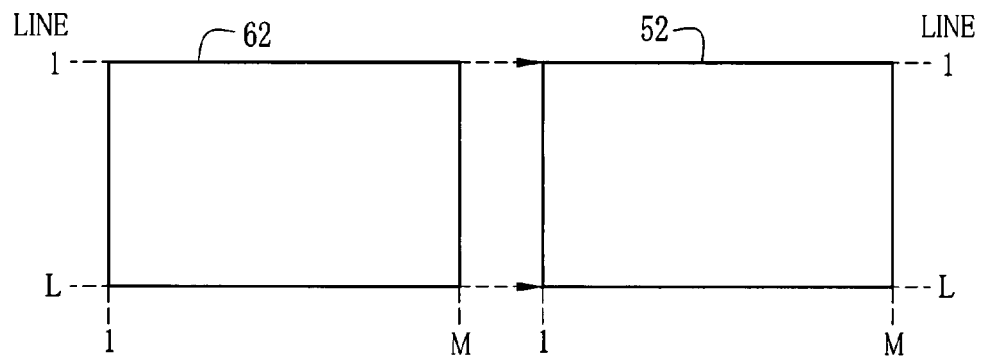
FIG. 4 is an explanatory diagram illustrating a condition of image data written in a VRAM in a normal shooting mode.
Figure 5:
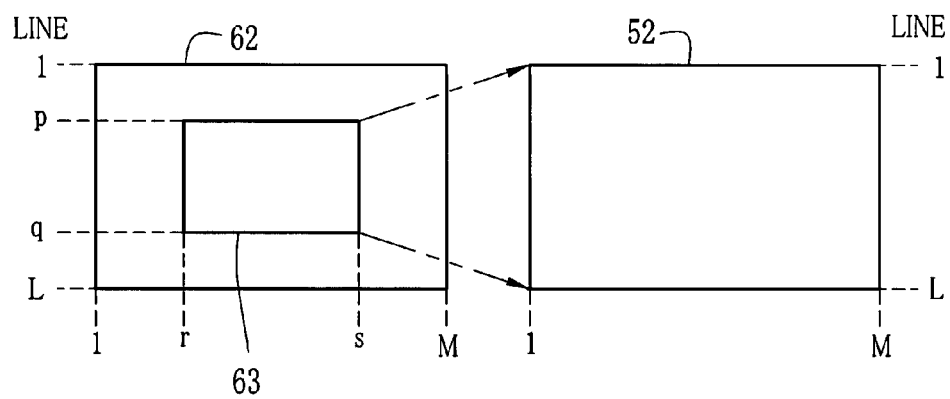
FIG. 5 is an explanatory diagram illustrating a condition of image data written in a VRAM in an electronic zooming mode.
Figure 6:
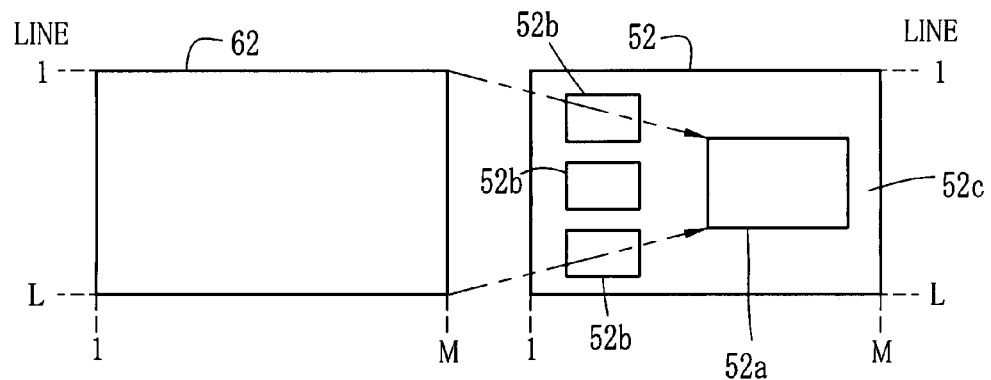
FIG. 6 is an explanatory diagram illustrating a condition of image data written in a VRAM in an assist thumbnail mode.

FIGS. 4 to 6 schematically illustrate how the image data is written in the VRAM 52 in respective modes on displaying the camera-through image. As described above, the VRAM 52 has a capacity for writing the image data of L lines×M pixels. When displaying the camera-through images on the LCD 15, the image data is read out of the memory card 25, from a first line after another. In the normal shooting mode, as shown in FIG. 4, the image data of L lines×M pixels of the effective image area 62 is written in the VRAM 52 by the digital image processor 46.

When displaying the camera-through images in the electronic zooming mode, the digital image processor 46 executes a cropping process of cropping the image cropping area 63, as shown in FIG. 5, from p-th line to q-th line and from r-th pixel to s-th pixel (p, q, r, s=positive integers) of the effective image area 62, wherein the size of the image cropping area 63 depends on the magnification of the electronic zooming. The image data of the image cropping area 63 are converted through the first resolution converting process into image data for one frame consisting of L lines×M pixels, and is written in the VRAM 52 sequentially from the first line after another.

In the assist thumbnail mode, the LCD 15 displays thumbnail images, which are obtained by scaling down the captured images as stored for example in the memory card 25, and the downsized camera-through image at a time. In this case, the thumbnail images and the camera-through image are displayed in predetermined sizes and at predetermined positions on the LCD 15 respectively.

As shown in FIG. 6, the image data of L lines×M pixels of the effective image area 62, as obtained through the image sensor 24, is converted into smaller absolute resolution by the second resolution converting process of the digital image processor 46 in the assist thumbnail mode. The image data of the smaller absolute resolution is written in a camera-through image recording area 52a of the VRAM 52, which corresponds to an image display area for displaying the camera-through image on the LCD 15. The thumbnail image data for displaying the thumbnail images is written in thumbnail image recording areas 52b of the VRAM 52, which correspond to the image display areas for displaying the thumbnail images on the LCD 15. The area other than the camera-through image recording area 52a and the thumbnail image recording areas 52b is a background recording area 52c where background image data is written. The image data of the camera-through image recording area 52a is updated synchronously with each shooting of the image sensor 24, while the thumbnail image data and the background image data are not updated. Thus, the downsized update camera-through image is displayed, while keeping the display of the thumbnail images fixed on the LCD 15.

Figure 7:
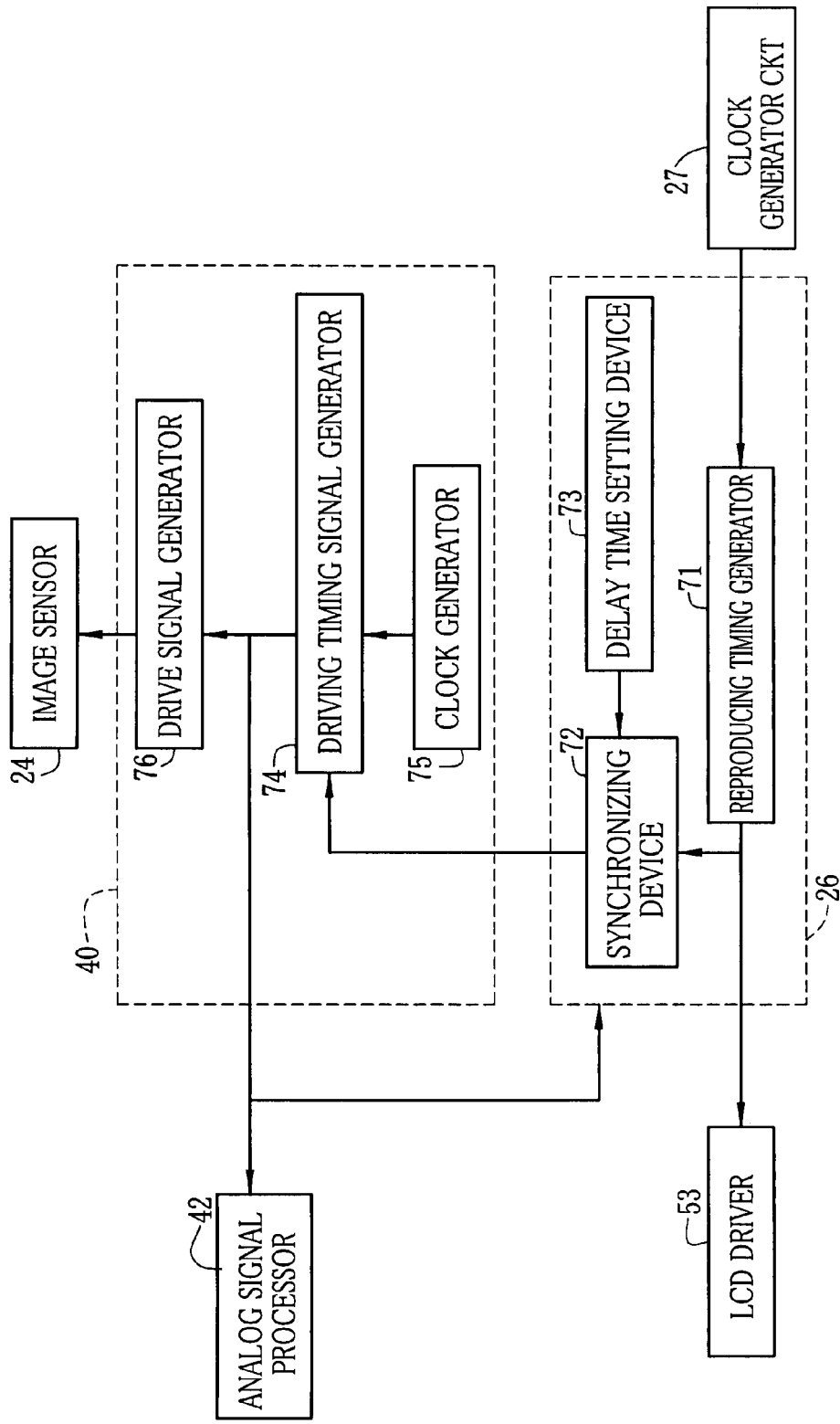
FIG. 7 is a functional block diagram illustrating how a drive timing signal and a reproduction timing signal are generated.
Figure 8:
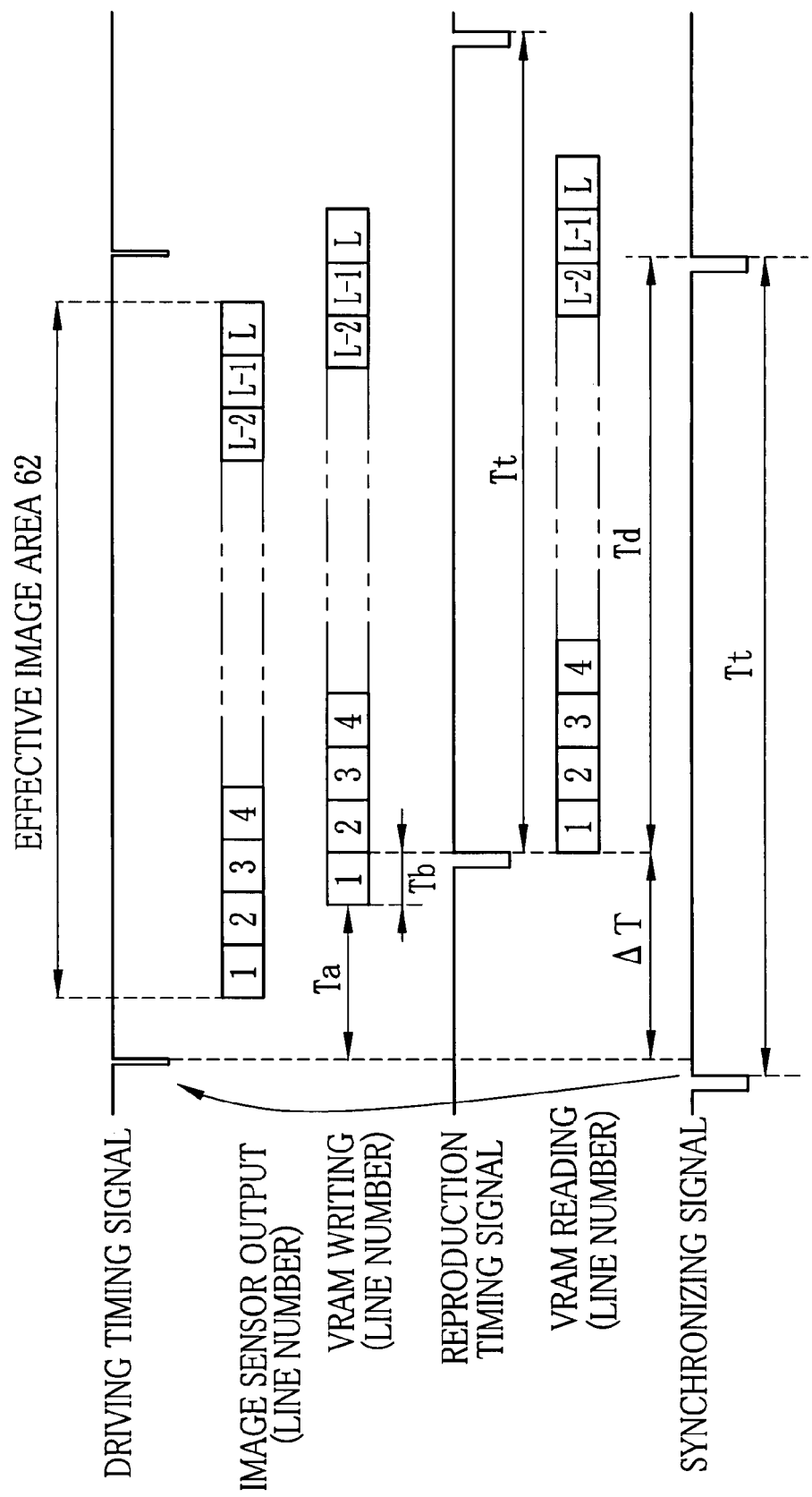
FIG. 8 is a timing chart illustrating signals outputted for displaying a camera-through image in the normal shooting mode.
Figure 9:
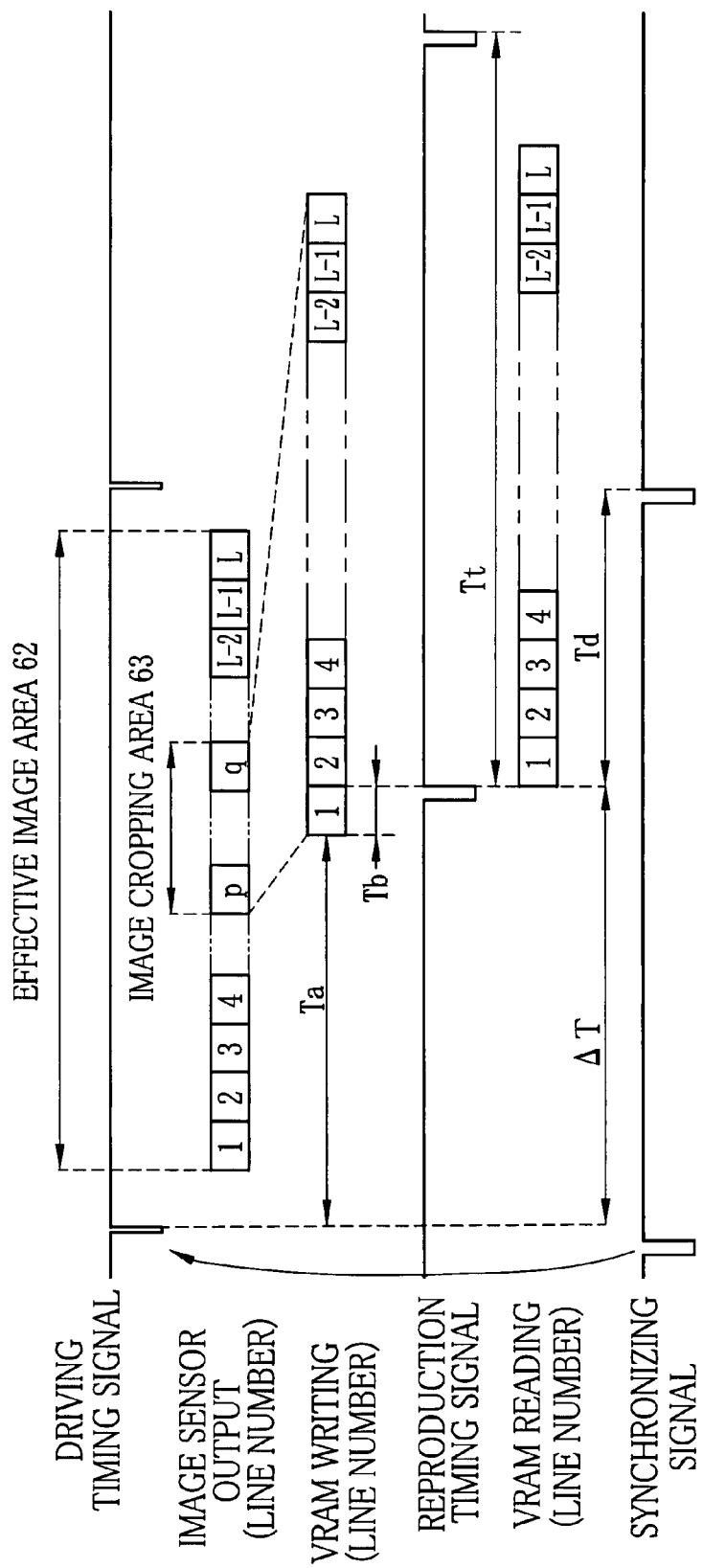
FIG. 9 is a timing chart illustrating signals outputted for displaying a camera-through image in the electronic zooming mode.
Figure 10:
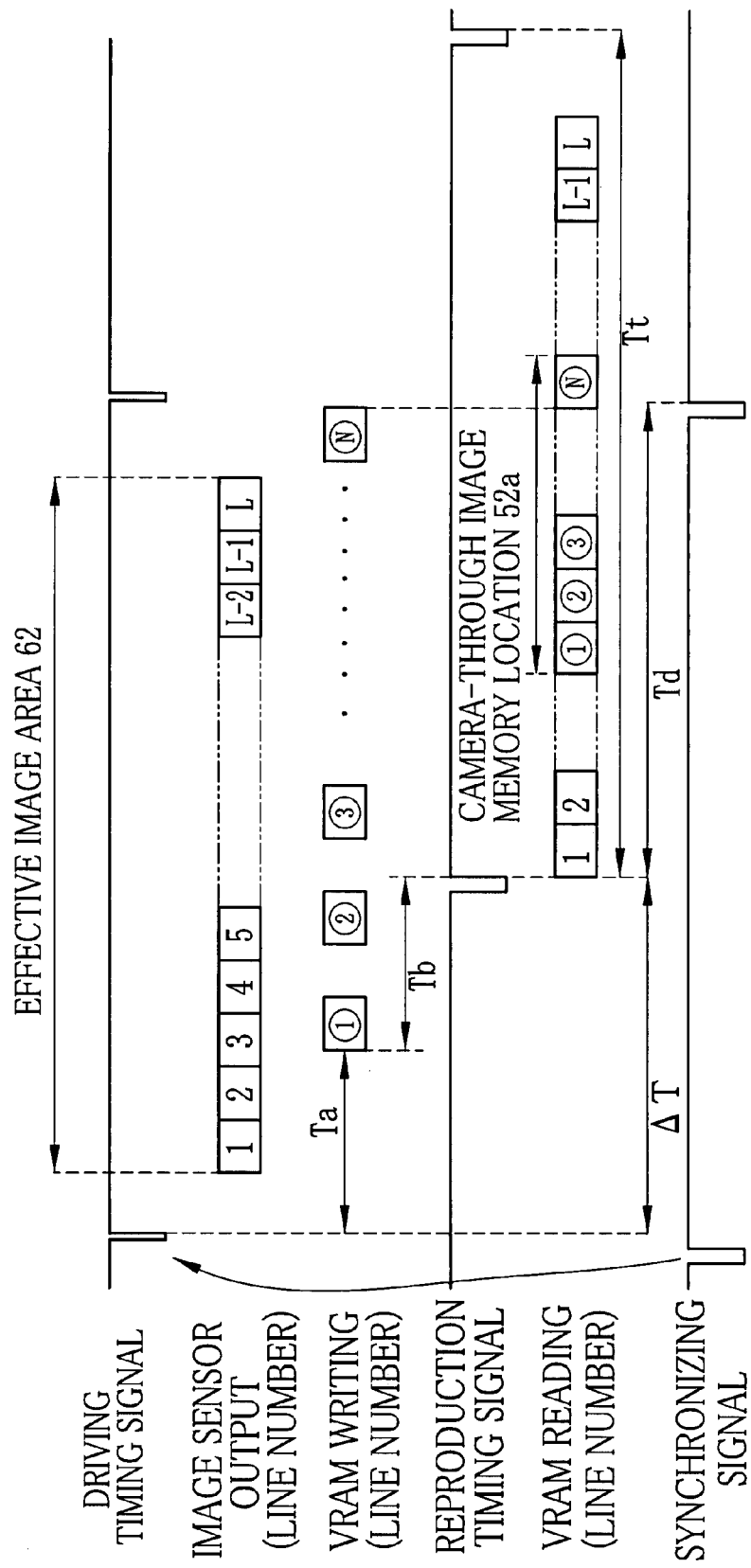
FIG. 10 is a timing chart illustrating signals outputted for displaying a camera-through image in the assist thumbnail mode.

FIG. 7 illustrates function blocks relating to generation of the driving timing signal and the reproduction timing signal, and FIGS. 8 to 10 illustrate timing charts relating to these timing signals. To display the camera-through images, a reproduction timing signal generator 71 of the CPU 26 generates the reproduction timing signal in a constant reproduction period Tt by dividing frequency of the clock signal supplied by the clock generator circuit 27. The reproduction timing signal is a timing signal which decides timing to start reading a frame of the image from the VRAM 52. When the reproduction timing signal is inputted, the LCD driver 53 as the reading device starts to read the image data from the first line to another out of the VRAM 52. The LCD driver 53 completes reading the image data of one frame within one reproduction period Tt.

A synchronizing device 72 is for synchronizing the driving timing signal with the reproduction timing signal while keeping a given phase difference between these timing signals. Thereby, the image data starts being read in a given time after the start of writing the image data of one frame in the VRAM 52, to display the camera-through image on the LCD 15. The synchronizing device 72 outputs the synchronizing signal that is delayed by a delay time Td to the reproduction timing signal, as shown in FIGS. 8 to 10. The delay time Td of the synchronizing device 72 is set by a delay time setting device 73, wherein the delay time varies depending upon which mode is selected among of the normal shooting mode, the electronic zooming mode or the assist thumbnail mode, as will be described in detail later.

A driving timing signal generator 74 of the timing generator 40 generates the driving timing signal every time the driving timing signal generator 74 receives the synchronizing signal from the synchronizing device 72. The driving timing signal generator 74 generates the driving timing signal in a predetermined imaging period Ti by dividing the frequency of the clock signal from a clock generator 75 that is provided for the driving timing signal generator 74. The timing of generating the driving timing signal is reset by a reset signal, and just after the reset, the driving timing signal generator 74 regenerates the driving timing signal. In the timing generator 40, the synchronizing signal functions as the reset signal to the driving timing signal generator 74. The imaging period Ti is predetermined to be longer than a generation period of the synchronizing signal, which is equal to the reproduction period Tt of the reproduction timing signal.

As described above, the driving timing signal generator 74 generates the driving timing signal just after receiving the synchronizing signal as the reset signal. Therefore, the driving timing signal synchronizes with the reproduction timing signal and delays to the reproduction timing signal by a phase equal to the delay time Td of the synchronizing signal to the reproduction timing signal. In other words, the driving timing signal advances by a phase difference $\Delta T$ (=Tt−Td) to the reproduction timing signal. The driving timing signal is sent to a drive signal generator 76, to be used for controlling driving timing of the image sensor 24. The driving timing signal is also sent to the analog signal processor 42 and the CPU 26, to be used for controlling timing of the analog signal processing, the digital signal processing and the like.

In response to the input of the driving timing signal, the drive signal generator 76 generates various driving signals to drive the image sensor 24 to shoot an image, namely, to start storing the charge corresponding to the received light and output the stored charge as the image signal. When displaying the camera-through images, the drive signal generator 76 generates the various driving signals so that the image sensor 24 completes shooting and outputting the image signal of one frame within the time Tt.

The above-mentioned phase difference $\Delta T$ represents a time difference from the output of the driving timing signal to a time when the reproduction timing signal is to be output. The time difference $\Delta T$ is determined so that the image data of one frame, which is to be displayed as the camera-through image, starts being read out of the VRAM 52 in a shorter time after the start of writing of the image data of that frame, than a necessary time for writing or reading the image data of one frame in or out of the VRAM 52. The phase difference $\Delta T$ and the reproduction period Tt decides the delay time Td in each mode.

FIG. 8 illustrates a timing chart on displaying the camera-through images in the normal shooting mode. Because the effective image area 62 is displayed as the camera-through image in the normal shooting mode, the image data of one frame of the effective image area 62 is written in the VRAM 52. The delay time Td is decided so that the image data starts being read out of the VRAM 52 in a shorter time than a necessary time for writing or reading the image data of one frame of the effective image area 62, after the start of writing of the image data in the VRAM 52.

Corresponding to the delay time Td in the normal shooting mode, the phase difference $\Delta T$ is determined to be a sum of a time Ta from the output or generation of the driving timing signal to the start of writing the image data of the first line of the effective image area 62 in the VRAM 52 and a time Tb for adjusting an interval between writing and reading of the image data.

In the normal shooting mode, the above-mentioned time Ta consists of a time lag from the generation of the driving timing signal to the output of the image signal of the effective image area 62 from the image sensor 24 and another time lag taken for the digital image possessing, such as the γ correction and the Y/C conversion of the digital image processor 46. The time Tb is determined so that the reading of the image data of one frame will not start at the same time or ahead of the writing of the image data, considering the necessary time for writing the image data of one frame in the VRAM 52, a writing period of the image data for each line and an interval of reading the image data from the VRAM 52. As the time Tb becomes the shorter, the shorter a time lag between shooting and displaying the camera-through images. So it is desirable to make the time Tb as short as possible. For example, the time Tb can be a time from the completion of writing the image data for one line to the completion of writing the image data for the next line in the VRAM 52.

According to this embodiment, the time Tb is determined to be the necessary time for writing the image data for one line in the VRAM 52, and the phase difference $\Delta T$ and thus the delay time Td are determined by the time Tb. Thereby the image data of one frame starts being read out of the VRAM 52 when the recording of the image data for the first line is completed in the VRAM 52.

If the absolute resolution of the effective image area 62 outputted from the image sensor 24 is different from that of the camera-through image to be displayed on the LCD 15, it is necessary to execute a converting process to match the absolute resolution with the LCD 15. In this case, the delay time Td may be decided by calculating the phase difference $\Delta T$, taking account of a necessary time for the resolution converting process.

FIG. 9 illustrates the timing chart on displaying the camera-through image in the electronic zooming mode. Because the image cropping area 63 cropped from the effective image area 62 is displayed as the camera-through image in the electronic zooming mode, the delay time Td is decided so that the reading of the VRAM 52 starts in a shorter time than a necessary time for writing or reading the image data of one frame of the image cropping area 63, after the writing of the image data of the image cropping area 63 in the VRAM 52 started.

Corresponding to the delay time Td in the electronic zooming mode, the phase difference $\Delta T$ is determined to be a sum of a time Ta from the output of the driving timing signal to the start of writing the image data of the first line of the image cropping area 63 in the VRAM 52 and a time Tb for adjusting an interval between writing and reading of the image data. Accordingly, in the electronic zooming mode, the time Ta consists of a time lag from the generation of the driving timing signal to the output of the first line of the image cropping area 63, i.e. the p-th line of the effective image area 62, and another time lag taken for the γ correction, the Y/C conversion, the cropping and the first resolution converting process in the digital image processor 46, and the like.

In a case where the first resolution converting process produces a line between two adjoining lines from the image data of the two adjoining lines, a time for completing the input of the second line is also included in the time lag. Also when the magnification of the electronic zooming is different, the first line of the image cropping area 63 corresponds to a different line of the effective image area 62, so it is necessary to decide the delay time Td for each individual step of magnification change in the electronic zooming.

FIG. 10 illustrates the timing charts on displaying the camera-through image in the assist thumbnail mode. FIG. 10 shows with circled numbers the first to the last (N-th) lines of image data after the second resolution converting process, which lines are to be written in a camera-through image memory location 52a of the VRAM 52. On displaying the camera-through images in the assist thumbnail mode, after the image data obtained through the second resolution converting process from the image data of the effective image area 62 starts being written in the camera-through image memory location 52a, the image data starts being read out of the VRAM 52 in a shorter time than a necessary time for writing or reading the image data of one frame. And the delay time Td is decided so that the LCD driver 52 starts reading the last line of the image data after completing the writing of the last line of the image data in the camera-through image memory location 52a.

According to this embodiment, the phase difference ΔT corresponding to the delay time Td in the assist thumbnail mode adjusts the time Tb so that the LCD driver 52 starts to read the last image data just after the image data for the last line of the camera-through image memory location 52a is written to the VRAM 52, which decides the delay time Td.

Next, the operation of the above described embodiment will be explained. When shooting, the digital camera 10 is powered-on and selects the shooting mode. When the shooting mode is selected, the CPU 26 generates the reproduction timing signal in the reproduction period, and outputs it to the LCD driver 52. After coming to output the reproduction timing signal, the CPU 26 generates the synchronizing signal, which is delayed by the delay time Td from the reproduction timing signal, and sends it to the timing generator 40. Immediately after the receipt of the synchronizing signal, the timing generator 40 generates the driving timing signal.

In synchronism with the reproduction timing signal which is generated repeatedly in the reproduction period, the driving timing signal is generated repeatedly, to drive the image sensor 24 correspondingly. As the result, the driving timing signal is generated in synchronism with the reproduction timing signal but advanced in the phase by the phase difference ΔT from the reproduction timing signal. Because the delay time Td varies depending upon which mode is selected among of the normal shooting mode, the electronic zooming mode and the assist thumbnail mode, the phase difference ΔT varies depending upon the mode correspondingly.

Every time the driving timing signal is generated, the timing generator 40 generates the various drive signals to drive the image sensor 24. This allows the image sensor 24 to shoot the subject in the synchronized timing with the driving timing signal, and output the image signal by starting transferring the charge stored by the previous shooting in the synchronized timing with the driving timing signal.

In the normal shooting mode, for example, the image signal from the image sensor 24 is sequentially converted from the analog signal to the digital image data in the analog signal processor 42, and thereafter subjected to the γ correction and the Y/C conversion in the digital image processor 46. The image data is written from the first line after another in the VRAM 52. As the result, the image data of L lines×M pixels is written in the VRAM 52.

Upon receipt of the reproduction timing signal from the CPU 26, the LCD driver 53 starts reading the image data from the VRAM 52. Because the driving timing signal is supposed to advance in the phase to the reproduction timing signal by the phase difference ΔT set in the normal shooting mode, the reading of the image data for the first line by the LCD driver 53 starts upon the writing of the image data for the first line in the VRAM 52 completes.

At the completion of reading the image data for the first line from the VRAM 52, the LCD driver 53 starts reading the image data for the next second line from the VRAM 52. The reading of the image data for the second line also starts just after the completion of writing the image data for the second line in the same way as the first line. In the same way as above, the image data for the third or following line starts being read immediately after the third or following line completes being written in the VRAM 52. The camera-through image is then displayed on the LCD 15, based on the read image data.

When the electronic zooming mode is selected by operating the zoom operating member 19, the digital image processor 46 sequentially processes the inputted image data for the electronic zooming, the image cropping process and the first resolution converting process, after the γ correction and the Y/C conversion of the image data. The processed image data is written from the first line to another in the VRAM 52. As the result, the image data of the image cropping area 63 is converted to image data of one frame of L lines×M pixels, and is written in the VRAM 52.

When the reproduction timing signal is inputted from the CPU 26 to the LCD driver 53, the LCD driver 53 starts reading the image data out of the VRAM 52 sequentially from the first to the last line. The driving signal is designated to advance in the phase to the reproduction timing signal by the phase difference ΔT considering the time lag from the generation of the driving signal to the output of the image data of the image cropping area 63 and the time lag due to the image cropping process and the first resolution converting process. Therefore, the reading of the image data for one line starts just after the digital image processor 46 completes writing the image data for one line to the VRAM 52, the image data is read one after another to display the camera-through images on the LCD 15.

When the assist thumbnail mode is set, the image data of for example three images is read out of the memory card 25 and thumbnail image data for each image is generated in the digital image processor 46. The thumbnail image data of the three images are written the respective thumbnail image recording areas 52b of the VRAM 52, and the background image data is written in the background recording area 52c.

Then the image sensor 24 starts being driven upon the driving timing signal which advances in the phase to the reproduction timing signal by the phase difference ΔT. The image signal from the image sensor 24 is sequentially converted to the image data in the analog signal processor 42, and the image data is sent to the digital image processor 46. When the image data is inputted, the digital image processor 46 subjects the image data to the γ correction and the Y/C conversion and thereafter subjects the image data of one frame constituted of L lines×M pixels to the second resolution converting process to generate image data for the downsized camera-through image, e.g. the image data of L/2 lines and M/2 pixels, and writes the gained image data for from the first line to another to the camera-through image memory location 52a of the VRAM 52.

On the other hand, when the reproduction timing signal is inputted from the CPU 26, the LCD driver 53 starts reading the image data written in the VRAM 52 sequentially from the first to the last line. Because the phase difference ΔT is set in the assist thumbnail mode so that the reading of the last line starts at the completion of writing the last line of the camera-through image memory location 52a, the image data is not simultaneously written and read in and out of the same location of the camera-through image memory location 52a during the reading of the image data from the camera-through image memory location 52a. Furthermore, the reading does not precede the writing.

In this way, the image data of L lines×M pixels, including the image data in the camera-through image memory location 52a and the thumbnail image data in the thumbnail image recording areas 52b, is sequentially read out of the VRAM 52, so the camera-through image is displayed on the LCD with the thumbnail images.

Thus, writing and reading of the image data is carried out synchronously with the driving timing signal and the reproduction timing signal which are generated periodically in the above described timings in either mode, so the camera-through image are displayed as a moving image on the LCD 15. A camera operator executes the pressing operation of the release button 16 to shoot and record a still image at each operation, while watching and framing the camera-through image displayed on the LCD 15. While the release button 16 is not pressed, the AE process and the AF process are executed periodically so as to display the camera-through image.

When the release button 16 is half-pressed, the switch S1 is turned on. When the switch S1 is turned on, the preparing processes are executed, including the AE process for deciding the shutter speed, the aperture size and the imaging sensitivity for shooting the still image and the AF process for bringing the taking lens 12 into focus on the subject. Because the writing of the image data in the VRAM 52 stops during the preparing processes, a frozen subject image is displayed on the LCD 15.

When the release button 16 is kept half-pressed even after completing the preparing processes, the camera-through images are displayed according to the same procedure as when the release button 16 is not pressed, like the image data for the frame shot in the synchronizing timing with the subsequent driving timing signal is written to the VRAM 52 in order and the image data is read in order from the VRAM 52 in the synchronizing timing with the reproduction timing signal.

Pressing the release button 16 farther to the full pressed position turns the switch S2 on. When the switch S2 is turned on, the CPU 26 changes the setting of the timing generator 40 for shooting the still images. Subsequently, the timing generator 40 generates the driving timing signal, which causes the image sensor 24 to start shooting and transferring the charge stored by the shooting, to output the image signal. The outputted image signal is converted into the image data through the analog signal processing, and then subjected to the digital image processing and the data compressing, to be recorded in the memory card 25 by the media controller 50.

Upon the release button 16 being full-pressed, the writing of the image data in the VRAM 52 stops to execute a so-called blackout, whereby the LCD 15 is blacked out for a short time, so that the camera operator may feel as if looking into a viewfinder of a single-lens reflex camera, where the image is blacked out for a moment as a mirror leaps up to switch a light path at each shutter release operation.

As described so far, because the delay of displaying the camera-through images on the LCD 15 is controlled to the minimum, it is possible to shoot the still image at an expected timing even when the camera operator operates the release button 16 while watching the camera-through image on the LCD 15.

Note that the present invention will achieve shooting the still image at a better timing if a quick mode is used in combination. The quick mode is designed to shoot a still image in a shorter time from the shutter release operation, by simplifying and thus speeding the AE process and the AF process which are made upon the release button 16 being half-pressed. For example, when the release button 16 is half-pressed in the quick mode, the AE process is executed using the camera-through image, and the AF process is executed in a relatively short shooting distance range while omitting an operation of compensating for temperature characteristics.

Although the electronic zooming mode and the thumbnail assist mode of the digital camera 10 have been described separately from each other, the present invention is applicable to a case where these modes are combined. For the electronic zooming mode, the thumbnail assist mode and the combined mode as well, the delay time Td can be calculated according to the following formula, on the basis of the delay time for the normal shooting mode:

$$Td = Td0 - [EZp/Hp \times \frac{1}{2} \times ScL] - [Atd \times Kat]$$

wherein the value Td0 represents the delay time for the normal shooting mode. The second item of the right side of this formula represents a correction amount according to the zoom ratio of the electronic zooming, wherein the value EZp represents the number of pixels in the horizontal direction of the image cropping area 63, and the value Hp represents the number of pixels in the horizontal direction of the effective image area 62. Accordingly, the ratio of EZp to Hp represents the zoom ratio of the electronic zooming.

The value ScL represents the number of scanning lines (horizontal lines) for displaying an image, so the value ScL varies depending upon the signal format of the display device. The delay time Td is set in the CPU 26 on the basis of the scanning line number ScL, so the maximum value of the delay time Td available for each signal format of the display device is equivalent to a time corresponding to the scanning line number ScL. Namely, when the delay time Td is measured in the scale of scanning line number, the maximum value of Td coincides with the value ScL.

The value ScL is "525" according to the NTSC format, and "625" according to the PAL format. Where the display device is an LCD, the value ScL varies depending upon the type and driving format of the LCD. For example, where the display line number of the LCD is 525, the value ScL is "525".

The value Atd represents a correction amount for the delay time in the assist thumbnail mode, and is decided mainly by the display location and the display size. The value Kat is a coefficient that is set to "1" in the assist thumbnail mode, or "0" in other modes, in order to validate the correction with the value Atd in the assist thumbnail mode.

Although the present invention has been described with respect to the preferred embodiments, the present invention is not to be limited to the above embodiments. The present invention is applicable to any kinds of imaging devices that display a camera-through image or live image of a subject that an image sensor is imaging at present. Therefore, various modifications will be possible without departing from the scope of claims appended hereto.

What is claimed is:

1. An imaging apparatus, comprising:
   a driving timing signal generator for generating a driving timing signal;
   an image sensor that is driven to shoot a subject to output an image signal of one frame synchronously with the driving timing signal;
   an image memory for storing the image signal of one frame;
   a writing device for writing the image signal of one frame in said image memory synchronously with the output of the image signal from said image sensor;
   a reproduction timing signal generator for generating a reproduction timing signal;
   a reading device that starts reading the image signal of one frame out of said image memory synchronously with the reproduction timing signal, to display an image of the subject shot by said image sensor;
   a synchronizing device for synchronizing the driving timing signal with the reproduction timing signal, while providing such a phase difference between the driving timing signal and the reproduction timing signal that said reading device starts reading the image signal of one frame before said writing device completes writing the image signal of said one frame in said image memory; and
   a first resolution converting device that crops a designated image cropping area out of the image signal of one frame before being written in said image memory, and converts an absolute resolution of said image cropping area so as to coincide with an absolute resolution of a display screen for displaying the image of the subject,
   wherein said writing device writes the image signal obtained from said first resolution converting device in said image memory, and said synchronizing device decides the phase difference between the driving timing signal and the reproduction timing signal, taking account of a time necessary for the process in said first resolution converting device.

2. An imaging device as claimed in claim 1, wherein said image cropping area is designated according to an electronic zoom ratio of said imaging device.

3. An imaging device as claimed in claim 1, further comprising a resolution converting device that converts the image signal of one frame to a smaller absolute resolution to display an image of the subject in a reduced size on a display screen, wherein said writing device writes an image signal obtained from said resolution converting device in a memory location of said image memory, corresponding to a display zone for displaying the reduced image on said display screen, whereas said reading device reads the image signal of one frame sequentially out of said image memory, including the image signal written in said memory location, and wherein said synchronizing device decides the phase difference between the driving timing signal and the reproduction timing signal, so that said reading device starts reading a last line of the image signal written in said memory location after the last line is written in said memory location.

4. An imaging device as claimed in claim 1, wherein said synchronizing device controls said driving timing signal generator so as to synchronize the driving timing signal on the basis of the reproduction timing signal.

5. An imaging device, comprising:
   a driving timing signal generator for generating a driving timing signal;
   an image sensor that is driven to shoot a subject to output an image signal of one frame synchronously with the driving timing signal;
   an image memory for storing the image signal of one frame;
   a writing device for writing the image signal of one frame in said image memory synchronously with the output of the image signal from said image sensor;
   a reproduction timing signal generator for generating a reproduction timing signal;
   a reading device that starts reading the image signal of one frame out of said image memory synchronously with the reproduction timing signal, to display an image of the subject shot by said image sensor; and
   a synchronizing device for synchronizing the driving timing signal with the reproduction timing signal, while providing such a phase difference between the driving timing signal and the reproduction timing signal that said reading device starts reading the image signal of one frame before said writing device completes writing the image signal of said one frame in said image memory,
   wherein said synchronizing device controls said driving timing signal generator so as to synchronize the driving timing signal on the basis of the reproduction timing signal,
   said driving timing signal generator generates the driving timing signal in a longer period than a generation period of the reproduction timing signal, and is reset to generate the driving timing signal immediately after the reset in response to a reset signal given from said synchronizing device, wherein said synchronizing device produces the reset signal by shifting the reproduction timing signal by a predetermined delay time.

6. An imaging device as claim 5, wherein said synchronizing device controls the delay time corresponding to the phase difference to be provided between the driving timing signal and the reproduction timing signal.

* * * * *